United States Patent
Nair et al.

(10) Patent No.: US 11,518,151 B2
(45) Date of Patent: Dec. 6, 2022

(54) BARRIER FILM AND IMPLEMENTATIONS THEREOF

(71) Applicant: Hariharan Krishnan Nair, Mumbai (IN)

(72) Inventors: Hariharan Krishnan Nair, Mumbai (IN); Gurunath Pozhal Vengu, Bangalore (IN)

(73) Assignee: Hariharan Krishnan Nair, Mumbai (IN)

(*) Notice: Subject to any disclaimer, the term of this patent is extended or adjusted under 35 U.S.C. 154(b) by 0 days.

(21) Appl. No.: 17/352,172

(22) Filed: Jun. 18, 2021

(65) Prior Publication Data

US 2021/0308995 A1 Oct. 7, 2021

Related U.S. Application Data

(63) Continuation of application No. 17/282,741, filed as application No. PCT/IN2020/050530 on Jun. 16, 2020.

(30) Foreign Application Priority Data

Dec. 13, 2019 (IN) .............................. 201921051881

(51) Int. Cl.
*B32B 27/08* (2006.01)
*B32B 27/30* (2006.01)
(Continued)

(52) U.S. Cl.
CPC .......... *B32B 27/08* (2013.01); *B29C 48/0018* (2019.02); *B29C 48/022* (2019.02);
(Continued)

(58) Field of Classification Search
CPC ......... B32B 27/08; B32B 1/08; B32B 27/306; B32B 27/32; B32B 27/34; B32B 2250/24;
(Continued)

(56) References Cited

U.S. PATENT DOCUMENTS 5,549,943 A 8/1996 Vicik
6,068,933 A 5/2000 Shepard et al.
(Continued)

FOREIGN PATENT DOCUMENTS

EP 3446870 A 2/2019
WO 1994/23941 A1 10/1994
(Continued)

OTHER PUBLICATIONS

Ndian Examination Report issued for Indian Patent Application No. 201921051881, dated Sep. 18, 2020 in 7 pages.
(Continued)

*Primary Examiner* — Michael C Miggins
(74) *Attorney, Agent, or Firm* — Knobbe, Martens, Olson & Bear, LLP (57) ABSTRACT

The present disclosure discloses multilayer barrier (F) comprising: (a) at least one polyolefin core layer (A); (b) at least one barrier layer (B) on both the sides of the core layer; and (c) at least one polyolefin layer (C) adjacent to the at least one barrier layer, wherein the at least one barrier layer individually has thickness in the range of 1 μm-25 μm. It also discloses a process of preparing the multilayer barrier film. Additionally, a laminate comprising the multilayer barrier film of the present disclosure and a process of preparing the laminate is discussed. Furthermore, an article comprising the multilayer barrier film or the laminate of the present disclosure is also disclosed.

25 Claims, 2 Drawing Sheets

(51) Int. Cl.
*B32B 27/34* (2006.01)
*B32B 1/08* (2006.01)
*B65D 65/40* (2006.01)
*B29C 48/00* (2019.01)
*B29C 48/10* (2019.01)
*B29C 48/21* (2019.01)
*B32B 27/32* (2006.01)
*B29L 31/00* (2006.01)
*B29K 23/00* (2006.01)
*B29L 23/00* (2006.01)

(52) U.S. Cl.
CPC .............. *B29C 48/10* (2019.02); *B29C 48/21* (2019.02); *B32B 1/08* (2013.01); *B32B 27/306* (2013.01); *B32B 27/32* (2013.01); *B32B 27/34* (2013.01); *B65D 65/40* (2013.01); *B29K 2023/0625* (2013.01); *B29K 2023/086* (2013.01); *B29L 2023/001* (2013.01); *B29L 2031/712* (2013.01); *B32B 2250/24* (2013.01); *B32B 2255/10* (2013.01); *B32B 2255/26* (2013.01); *B32B 2307/7244* (2013.01); *B32B 2553/00* (2013.01); *B32B 2597/00* (2013.01)

(58) Field of Classification Search
CPC .. B32B 2255/10; B32B 2255/26; B65D 65/40
See application file for complete search history.

(56) References Cited

U.S. PATENT DOCUMENTS

| | | | |
|---|---|---|---|
| 6,562,476 | B2 | 5/2003 | Shepard et al. |
| 6,699,549 | B1 | 3/2004 | Ueyama et al. |
| 6,720,046 | B2 | 4/2004 | Schwartz et al. |
| 7,794,848 | B2 | 9/2010 | Breese |
| 9,662,863 | B2 | 5/2017 | Lorenzetti et al. |
| 2002/0155308 | A1 | 10/2002 | Heffelfinger et al. |
| 2012/0100356 | A1 | 4/2012 | Ohlsson et al. |
| 2014/0199505 | A1 | 7/2014 | Lorenzetti et al. |
| 2015/0158235 | A1* | 6/2015 | Van Loon ............... B32B 27/32 428/218 |
| 2016/0200080 | A1* | 7/2016 | Muslet .................... B32B 27/08 428/213 |
| 2019/0010307 | A1* | 1/2019 | King, III .................. C08K 5/17 |

FOREIGN PATENT DOCUMENTS

| | | |
|---|---|---|
| WO | 00/16977 A1 | 3/2000 |
| WO | 2002/060625 A2 | 8/2002 |
| WO | 2002/072347 A2 | 9/2002 |

OTHER PUBLICATIONS

International Search Report issue for International Patent Application No. PCT/IN2020/050530, dated Sep. 21, 2020 in 5 pages.
European Search Report issud for European Patent Application No. 20870475.9, dated May 23, 2022 in 5 pages.

* cited by examiner

BARRIER FILM AND IMPLEMENTATIONS THEREOF

CROSS-REFERENCE TO RELATED APPLICATIONS

This application is a continuation of U.S. application Ser. No. 17/282,741, filed on Apr. 2, 2021 as the U.S. National Phase under 35. U.S.C. § 371 of International Application PCT/IN2020/050530, filed Jun. 16, 2020, which claims priority to Indian Patent Application No. 201921051881, filed Dec. 13, 2019. The disclosures of the above-described applications are hereby incorporated by reference in their entirety.

TECHNICAL FIELD OF THE INVENTION

The present invention relates to a barrier film for packaging comprising multi-layers. It also relates to a process of manufacturing such a multilayer barrier film, a laminate comprising the barrier film, and a process of preparing the laminate. It further relates to an article comprising the barrier film or the laminate. Furthermore, the present invention relates to the use of the barrier film or the laminate in an article/packaging material.

BACKGROUND OF THE INVENTION

Packaging is an essential part of a product in today's developing world. Barrier property of packaging material is one of the critical properties for achieving product stability. Typically, various materials like aluminium, nylon, ethylene vinyl alcohol (EVOH), polyvinyl alcohol (PVOH), polyethylene terephthalate (PET), aluminium oxide, silicon oxide, etc. are used as barrier layers in food packaging applications.

The multilayer packaging films often comprise an oxygen barrier layer, which is typically a core layer positioned between at least two other layers. EVOH is among the preferable barrier material because of its low oxygen permeability, effective barrier to odors, fragrances, solvents, and oils and is therefore used as a component in the barrier film to improve its barrier properties. The barrier properties of EVOH depend on various parameters like the percentage of ethylene, actual thickness of the barrier layer, relative humidity etc.

EVOH exhibits very good barrier properties to oxygen. Additionally, to improve the processability while maintaining desirable levels of oxygen barrier properties, EVOH barrier layers can be placed in contact with additional layers of polyamides.

Multilayer films comprising one or more polyamide layers in contact with an EVOH barrier layer can provide improved impact resistance, flex crack resistance, or drawability to the multilayer film. For example, U.S. Pat. Nos. 6,068,933 and 6,562,476 disclose multilayer films comprising two nylon layers in contact with an EVOH barrier layer. Multilayer films can comprise a polyester layer in addition to a polyamide layer. For example, U.S. Pat. No. 6,699,549 discloses multilayer structures comprising a polyester layer and a polyamide layer. However, the barrier properties, such as Oxygen Transmission Rate (OTR) values achieved by such kinds of a structure is generally greater than 0.2 $cm^3/m^2/1$ day/1 atm. It is, therefore, the object of the present disclosure to provide barrier films with enhanced barrier efficiency.

SUMMARY OF THE INVENTION

In an aspect of the present disclosure, there is provided a multilayer barrier film (F) comprising: (a) at least one polyolefin core layer (A); (b) at least one barrier layer (B) on both the sides of the core layer; and (c) at least one polyolefin layer (C) adjacent to the at least one barrier layer, wherein the at least one barrier layer individually has a thickness in the range of 1 μm-25 μm.

In another aspect of the present disclosure, there is provided a process of preparing the multilayer barrier film comprising: (a) at least one polyolefin core layer (A); (b) at least one barrier layer (B) on both the sides of the core layer; and (c) at least one polyolefin layer (C) adjacent to the at least one barrier layer, wherein the at least one barrier layer individually has a thickness in the range of 1 μm-25 μm, wherein the film is prepared by a process selected from blown film process, cast film process, or lamination process of blown or cast films.

In yet another aspect of the present disclosure, there is provided a laminate comprising: (a) at least one print layer (X); (b) the multilayer barrier film (F) comprising: (i) at least one polyolefin core layer (A); (ii) at least one barrier layer (B) on both the sides of the core layer; and (iii) at least one polyolefin layer (C) adjacent to the at least one barrier layer, wherein the at least one barrier layer individually has a thickness in the range of 1 μm-25 μm; and (c) at least one sealant layer (Y).

In a further aspect of the present disclosure, there is provided a process of preparing the laminate comprising: (a) at least one print layer (X); (b) the multilayer barrier film (F) comprising: (i) at least one polyolefin core layer (A); (ii) at least one barrier layer (B) on both the sides of the core layer; and (iii) at least one polyolefin layer (C) adjacent to the at least one barrier layer, wherein the at least one barrier layer individually has a thickness in the range of 1 μm-25 μm; and (c) at least one sealant layer (Y), the process comprising laminating the layer and the barrier film by adhesive lamination or extrusion lamination.

In another aspect of the present disclosure, there is provided an article comprising the multilayer barrier film of the present disclosure or the laminate of the present disclosure.

In yet another aspect of the present disclosure, there is provided a use of the multilayer barrier film of the present disclosure or the laminate of the present disclosure for packaging material.

These and other features, aspects and advantages of the present subject matter will be better understood with reference to the following description and appended claims. This summary is provided to introduce a selection of concepts in a simplified form. This summary is not intended to identify key features or essential features of the claimed subject matter, nor is it intended to be used to limit the scope of the claimed subject matter.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Those skilled in the art will be aware that the present disclosure is subject to variations and modifications other than those specifically described. It is to be understood that the present disclosure includes all such variations and modifications. The disclosure also includes all such steps, features, compositions and compounds referred to or indicated in this specification, individually or collectively and any and all combinations of any or more of such steps or features.

Definitions

For convenience, before further description of the present disclosure, certain terms employed in the specification, and examples are collected here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. Throughout this specification, unless the context requires otherwise the word "comprise", and variations, such as "comprises" and "comprising", will be understood to imply the inclusion of a stated element or step or group of element or steps but not the exclusion of any other element or step or group of element or steps.

The term "including" is used to mean "including but not limited to". "Including" and "including but not limited to" are used interchangeably.

The phrase "at least one polyolefin core layer (A)" refers to any polyethylene selected from the group consisting of high density polyethylene, medium density polyethylene, low density polyethylene, linear low density polyethylene, polypropylene, propylene copolymers, ethylene copolymers, polymethyl pentene, and combinations thereof.

The phrase "at least one polyolefin layer (C)" refers to any polyethylene selected from the group consisting of high density polyethylene, medium density polyethylene, low density polyethylene, linear low density polyethylene, polypropylene, propylene copolymers, ethylene copolymers, polymethyl pentene and combinations thereof.

The phrase "high density polyethylene" as used herein refers to polyethylene having a density usually in the range of from about 0.94 g/cm$^3$ to about 0.97 g/cm$^3$. The term HDPE and high density polyethylene may be interchangeably used. The melt flow index may be in the range of 0.2 to 8 g/10 min, more specifically in the range of 0.2 to 2.0 g/10 min.

The phrase "medium density polyethylene" as used herein refers to polyethylene having a density usually in the range of from about 0.926 g/cm$^3$ to about 0.941 g/cm$^3$. The term MDPE and medium density polyethylene may be interchangeably used.

The phrase "low density polyethylene" as used herein refers to polyethylene having a density usually in the range of from about 0.910 g/cm$^3$ to about 0.925 g/cm$^3$. The term LDPE and low density polyethylene may be interchangeably used.

The phrase "linear low density polyethylene" as used herein refers to polyethylene having a density usually in the range of from about 0.910 g/cm$^3$ to about 0.930 g/cm$^3$. The term LLDPE and linear low density polyethylene may be interchangeably used.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a thickness range of about 20 μm to about 200 μm should be interpreted to include not only the explicitly recited limits of about 30 μm to about 180 μm, but also to include sub-ranges, such as 65 μm to 175 μm, 70 μm to 160 μm, and so forth, as well as individual amounts, including fractional amounts, within the specified ranges, such as 65.2 μm, 140.6 μm, and 161.3 μm, for example.

As discussed above, barrier film(s) with enhanced barrier properties is the need of the hour. Therefore, to address the need, the present disclosure provides multilayer barrier film which helps in increasing the barrier properties of the film using the same or lesser thickness of the at least one barrier layer. The structure of the multilayer barrier film is such that even with reduced thickness of the barrier layer, the barrier properties are surprisingly enhanced, i.e., replacing a single barrier layer of certain thickness with two barrier layers separated by a polyolefin core layer results in a film with enhanced barrier properties. Enhanced barrier properties herein refer to reduction of OTR approximately at least 2-15 times.

In an embodiment of the present disclosure, there is provided a multilayer barrier film (F) comprising: (a) at least one polyolefin core layer (A); (b) at least one barrier layer (B) on both the sides of the core layer; and (c) at least one polyolefin layer (C) adjacent to the at least one barrier layer, wherein the at least one barrier layer individually has a thickness in the range of 1 μm-25 μm. In an embodiment of the present disclosure, there is provided a multilayer barrier film as described herein, wherein the film with respect to the core layer can be symmetrical or asymmetrical in-terms of layers.

In an embodiment of the present disclosure, there is provided a multilayer barrier film (F) comprising: (a) at least one polyolefin core layer (A); (b) at least one barrier layer (B) on both the sides of the core layer; and (c) at least one polyolefin layer (C) adjacent to the at least one barrier layer, wherein the at least one barrier layer individually has a thickness in the range of 1 μm-20 μm.

In an embodiment of the present disclosure, there is provided a multilayer barrier film (F) comprising: (a) at least one polyolefin core layer (A); (b) at least one barrier layer (B) on both the sides of the core layer; and (c) at least one polyolefin layer (C) adjacent to the at least one barrier layer, wherein the at least one barrier layer individually has a thickness in the range of 2 μm-20 μm.

In an embodiment of the present disclosure, there is provided a multilayer barrier film (F) comprising: (a) at least one polyolefin core layer (A); (b) at least one barrier layer (B) on both the sides of the core layer; and (c) at least one polyolefin layer (C) adjacent to the at least one barrier layer, wherein the at least one barrier layer individually has a thickness in the range of 3 μm-20 μm.

In an embodiment of the present disclosure, there is provided a multilayer barrier film (F) comprising: (a) at least one polyolefin core layer (A); (b) at least one barrier layer (B) on both the sides of the core layer; and (c) at least one polyolefin layer (C) adjacent to the at least one barrier layer, wherein the at least one barrier layer individually has a thickness in the range of 5 μm-18 μm.

In an embodiment of the present disclosure, there is provided a multilayer barrier film (F) comprising: (a) at least one polyolefin core layer (A); (b) at least one barrier layer (B) on both the sides of the core layer; and (c) at least one polyolefin layer (C) adjacent to the at least one barrier layer, wherein the at least one barrier layer individually has a thickness in the range of 5 μm-16 μm.

In an embodiment of the present disclosure, there is provided a multilayer barrier film (F) comprising: (a) at least one polyolefin core layer (A); (b) at least one barrier layer (B) on both the sides of the core layer; and (c) at least one polyolefin layer (C) adjacent to the at least one barrier layer, wherein the at least one barrier layer individually has a thickness in the range of 5 μm-15 μm.

In an embodiment of the present disclosure, there is provided a multilayer barrier film (F) comprising: (a) at least one polyolefin core layer (A); (b) at least one barrier layer (B) on both the sides of the core layer; and (c) at least one polyolefin layer (C) adjacent to the at least one barrier layer, wherein the at least one barrier layer individually has a thickness in the range of 1 μm-25 μm, further comprises at least one tie layer (D). In another embodiment of the present disclosure, the at least one tie layer (D) is present in between the at least one polyolefin core layer (A) and the at least one barrier layer (B). In yet another embodiment of the present disclosure, the at least one tie layer (D) is present in between the at least one barrier layer (B) and the at least one polyolefin layer (C). In a further embodiment of the present disclosure, the at least one tie layer is present between, the at least one polyolefin core layer (A) and the at least one barrier layer (B) and between the at least one barrier layer (B) and the at least one polyolefin layer (C). In yet another embodiment of the present disclosure, the at least one polyolefin core layer (A) and the at least one barrier layer (B) have to be connected via the at least one tie layer (D). The tie layer is therefore provided between the at least one barrier layer (B) and the at least one polyolefin core layer (A). The tie layer (D) ensures that the barrier layer (B) and polyolefin core layer (A) are sufficiently tightly connected to each other that both layers (B) and (A) can be jointly drawn and the mutual adhesion is preserved. In a further embodiment of the present disclosure, the at least one barrier layer (B) and the at least one polyolefin layer (C) have to be connected via the at least one tie layer (D). The tie layer is therefore provided between the at least one barrier layer (B) and the at least one polyolefin layer (C). The tie layer (D) ensures that the barrier layer (B) and polyolefin layer (C) are sufficiently tightly connected to each other that both layers (B) and (C) can be jointly drawn and the mutual adhesion is preserved. The at least one tie (D) layer is a layer based on modified polyolefins. The modified polyolefins are based on ethylene polymers or propylene polymers. The modified polyolefins may be selected from the group consisting of maleated polyethylene, ethylene-acrylic acid copolymer, ethylene-meth acrylic acid copolymer, anhydride grafted ethylene/1-butene copolymer, anhydride grafted ethylene/1-hexene copolymer, polypropylene, propylene ethylene copolymer, ethylene vinyl acetate copolymer, ethylene methyl acrylate copolymer, and anhydride grafted ethylene/1-octene copolymer.

In an embodiment of the present disclosure, there is provided a multilayer barrier film (F) comprising: (a) at least one polyolefin core layer (A); (b) at least one barrier layer (B) on both the sides of the core layer; and (c) at least one polyolefin layer (C) adjacent to the at least one barrier layer, wherein the at least one barrier layer individually has a thickness in the range of 1 μm-20 μm, and further comprises at least one tie layer (D). In another embodiment of the present disclosure, the at least one tie layer (D) is present in between the at least one polyolefin core layer (A) and the at least one barrier layer (B). In yet another embodiment of the present disclosure, the at least one tie layer (D) is present in between the at least one barrier layer (B) and the at least one polyolefin layer (C). In a further embodiment of the present disclosure, the at least one tie layer (D) is present between, the at least one polyolefin core layer (A) and the at least one barrier layer (B) and between the at least one barrier layer (B) and the at least one polyolefin layer (C).

In an embodiment of the present disclosure, there is provided a multilayer barrier film (F) as described herein further comprises at least one tie layer (D), wherein the at least one tie layer comprises a polymeric adhesive selected from the group consisting of maleated polyethylene, ethylene-acrylic acid copolymer, ethylene-meth acrylic acid copolymer, anhydride grafted ethylene/1-butene copolymer, anhydride grafted ethylene/1-hexene copolymer, polypropylene, propylene ethylene copolymer, ethylene vinyl acetate copolymer, ethylene methyl acrylate copolymer, and anhydride grafted ethylene/1-octene copolymer.

In an embodiment of the present disclosure, there is provided a multilayer barrier film (F) as described herein further comprises at least one tie layer (D) and the at least one tie layer (D) has a thickness in the range of 2 μm-40 μm. In another embodiment of the present disclosure, the at least one tie layer (D) has a thickness in the range of 5 μm-40 μm. In yet another embodiment of the present disclosure, the at least one tie layer (D) has a thickness in the range of 5 μm-35 μm. In a further embodiment of the present disclosure, the at least one tie layer (D) has a thickness in the range of 5 μm-30 μm. In an alternate embodiment of the present disclosure, the at least one tie layer (D) has a thickness in the range of 10 μm-30 μm.

In an embodiment of the present disclosure, there is provided a multilayer barrier film (F) comprising: (a) at least one polyolefin core layer (A); (b) at least one barrier layer (B) on both the sides of the core layer; and (c) at least one polyolefin layer (C) adjacent to the at least one barrier layer, wherein the at least one barrier layer (B) individually has a thickness in the range of 1 μm-25 μm, and wherein the at least one polyolefin core layer is multilayer. In another embodiment of the present disclosure, the at least one polyolefin core layer (C) is a two-layered structure. In yet another embodiment of the present disclosure, the at least one polyolefin core layer (C) is a three-layered structure. In a further embodiment of the present disclosure, when the at least one polyolefin core layer (C) is a two-layered structure or three-layered structure, the two layers or three layers may be joined by a tie polyethylene layer.

In an embodiment of the present disclosure, there is provided a multilayer barrier film (F) comprising: (a) at least one polyolefin core layer (A); (b) at least one barrier layer (B) on both the sides of the core layer; and (c) at least one polyolefin layer (C) adjacent to the at least one barrier layer, wherein the at least one barrier layer individually has a thickness in the range of 1 μm-20 μm, and wherein the at least one polyolefin core layer is multilayer. In another embodiment of the present disclosure, the at least one polyolefin core layer (C) is a two-layered structure. In yet another embodiment of the present disclosure, the at least one polyolefin core layer (C) is a three-layered structure. In a further embodiment of the present disclosure, when the at least one polyolefin core layer (C) is a two-layered structure or three-layered structure, the two layers or three layers may be joined by a tie polyethylene layer.

In an embodiment of the present disclosure, there is provided a multilayer barrier film (F) comprising: (a) at least one polyolefin core layer (A); (b) at least one barrier layer (B) on both the sides of the core layer; and (c) at least one polyolefin layer (C) adjacent to the at least one barrier layer, wherein the at least one barrier layer individually has a thickness in the range of 1 μm-25 μm, and wherein the at least one polyolefin core layer (A) comprises at least one polymer having a density in the range of 0.833 g/cm$^3$-0.99 g/cm$^3$. In another embodiment of the present disclosure, the polymer has a density in the range of 0.855 g/cm$^3$-0.98 g/cm$^3$. In yet another embodiment of the present disclosure, the polymer has a density in the range of 0.93 gm/cm$^3$-0.96 g/cm$^3$. In a further embodiment of the present disclosure, the polymer has a density in the range of 0.94 gm/cm$^3$-0.96 g/cm$^3$.

In an embodiment of the present disclosure, there is provided a multilayer barrier film (F) comprising: (a) at least one polyolefin core layer (A); (b) at least one barrier layer (B) on both the sides of the core layer; and (c) at least one polyolefin layer (C) adjacent to the at least one barrier layer, wherein the at least one barrier layer individually has a thickness in the range of 1 μm-20 μm, and wherein the at least one polyolefin core layer (A) comprises at least one polymer having a density in the range of 0. 0.833 gm/cm$^3$-0.99 g/cm$^3$. In another embodiment of the present disclosure, the polymer has a density in the range of 0.855 gm/cm$^3$-0.98 g/cm$^3$. In yet another embodiment of the present disclosure, the polymer has a density in the range of 0.93 gm/cm$^3$-0.96 g/cm$^3$. In a further embodiment of the present disclosure, the polymer has a density in the range of 0.94 gm/cm$^3$-0.96 g/cm$^3$.

In an embodiment of the present disclosure, there is provided a multilayer barrier film (F) comprising: (a) at least one polyolefin core layer (A); (b) at least one barrier layer (B) on both the sides of the core layer; and (c) at least one polyolefin layer (C) adjacent to the at least one barrier layer, wherein the at least one barrier layer individually has a thickness in the range of 1 μm-25 μm, and wherein the at least one polyolefin core layer (A) has a thickness in the range of 1 μm-100 μm. In an alternate embodiment of the present disclosure, the at least one polyolefin core layer (A) has a thickness in the range of 5 μm-90 μm. In another embodiment of the present disclosure, the at least one polyolefin core layer (A) has a thickness in the range of 20 μm-90 μm. In yet another embodiment of the present disclosure, the at least one polyolefin core layer (A) has a thickness in the range of 20 μm-80 μm. In a further embodiment of the present disclosure, the at least one polyolefin core layer (A) has a thickness in the range of 20 μm-60 μm.

In an embodiment of the present disclosure, there is provided a multilayer barrier film (F) comprising: (a) at least one polyolefin core layer (A); (b) at least one barrier layer (B) on both the sides of the core layer; and (c) at least one polyolefin layer (C) adjacent to the at least one barrier layer, wherein the at least one barrier layer individually has a thickness in the range of 1 μm-100 μm. In an alternate embodiment of the present disclosure, the at least one polyolefin core layer (A) has a thickness in the range of 5 μm-90 μm. In another embodiment of the present disclosure, the at least one polyolefin core layer (A) has a thickness in the range of 20 μm-90 μm. In yet another embodiment of the present disclosure, the at least one polyolefin core layer (A) has a thickness in the range of 20 μm-80 μm. In a further embodiment of the present disclosure, the at least one polyolefin core layer (A) has a thickness in the range of 20 μm-60 μm.

In an embodiment of the present disclosure, there is provided a multilayer barrier film (F) comprising: (a) at least one polyolefin core layer (A); (b) at least one barrier layer (B) on both the sides of the core layer; and (c) at least one polyolefin layer (C) adjacent to the at least one barrier layer, wherein the at least one barrier layer individually has a thickness in the range of 1 μm-25 μm, and wherein the at least one polyolefin layer (C) comprises at least one polymer having a density in the range of 0.833 gm/cm$^3$-0.99 g/cm$^3$. In another embodiment of the present disclosure, the polymer has a density in the range of 0.855 gm/cm$^3$-0.98 g/cm$^3$. In yet another embodiment of the present disclosure, the polymer has a density in the range of 0.93 gm/cm$^3$-0.96 g/cm$^3$. In a further embodiment of the present disclosure, the polymer has a density in the range of 0.94 gm/cm$^3$-0.96 g/cm$^3$.

In an embodiment of the present disclosure, there is provided a multilayer barrier film (F) comprising: (a) at least one polyolefin core layer (A); (b) at least one barrier layer (B) on both the sides of the core layer; and (c) at least one polyolefin layer (C) adjacent to the at least one barrier layer, wherein the at least one barrier layer individually has a thickness in the range of 1 μm-20 μm, and wherein the at least one polyolefin layer (C) comprises at least one polymer having a density in the range of 0.833 gm/cm$^3$-0.99 g/cm$^3$. In another embodiment of the present disclosure, the polymer has a density in the range of 0.855 gm/cm$^3$-0.98 g/cm$^3$. In yet another embodiment of the present disclosure, the polymer has a density in the range of 0.93 gm/cm$^3$-0.96 g/cm$^3$. In a further embodiment of the present disclosure, the polymer has a density in the range of 0.94 gm/cm$^3$-0.96 g/cm$^3$.

In an embodiment of the present disclosure, there is provided a multilayer barrier film (F) comprising: (a) at least one polyolefin core layer (A); (b) at least one barrier layer (B) on both the sides of the core layer; and (c) at least one polyolefin (C) adjacent to the at least one barrier layer, wherein the at least one barrier layer individually has a thickness in the range of 1 μm-25 μm, and wherein the at least one polyolefin layer (C) has a thickness in the range of 3 μm-100 μm. In one another embodiment of the present disclosure, the at least one polyolefin layer (C) has a thickness in the range of 5 μm-90 μm. In an alternate embodiment of the present disclosure, the at least one polyolefin layer (C) has a thickness in the range of 15 μm-80 μm. In another embodiment of the present disclosure, the at least one polyolefin layer (C) has a thickness in the range of 15 μm-70 μm. In yet another embodiment of the present disclosure, the at least one polyolefin layer (C) has a thickness in the range of 18 μm-65 μm. In a further embodiment of the present disclosure, the at least one polyolefin layer (C) has a thickness in the range of 20 μm-60 μm.

In an embodiment of the present disclosure, there is provided a multilayer barrier film (F) comprising: (a) at least one polyolefin core layer (A); (b) at least one barrier layer (B) on both the sides of the core layer; and (c) at least one polyolefin (C) adjacent to the at least one barrier layer, wherein the at least one barrier layer (B) individually has a thickness in the range of 1 µm-20 µm, and wherein the at least one polyolefin layer (C) has a thickness in the range of 3 µm-100 µm. In one another embodiment of the present disclosure, the at least one polyolefin layer (C) has a thickness in the range of 5 µm-90 µm. In an alternate embodiment of the present disclosure, the at least one polyolefin layer (C) has a thickness in the range of 15 µm-80 µm. In another embodiment of the present disclosure, the at least one polyolefin layer (C) has a thickness in the range of 15 µm-70 µm. In yet another embodiment of the present disclosure, the at least one polyolefin layer (C) has a thickness in the range of 18 µm-65 µm. In a further embodiment of the present disclosure, the at least one polyolefin layer (C) has a thickness in the range of 20 µm-60 µm.

In an embodiment of the present disclosure, there is provided a multilayer barrier film (F) comprising: (a) at least one polyolefin core layer (A); (b) at least one barrier layer (B) on both the sides of the core layer; and (c) at least one polyolefin layer (C) adjacent to the at least one barrier layer, wherein the at least one barrier layer individually has a thickness in the range of 1 µm-25 µm, and wherein the at least one polyolefin layer (C) is multilayer. In another embodiment of the present disclosure, the at least one polyolefin layer (C) is a two-layered structure. In yet another embodiment of the present disclosure, the at least one polyolefin layer (C) is a three-layered structure. In a further embodiment of the present disclosure, when the at least one polyolefin layer (C) is a two-layered structure or three-layered structure, the two layers or three layers may be joined by a tie polyethylene layer.

In an embodiment of the present disclosure, there is provided a multilayer barrier film (F) comprising: (a) at least one polyolefin core layer (A); (b) at least one barrier layer (B) on both the sides of the core layer; and (c) at least one polyolefin layer (C) adjacent to the at least one barrier layer, wherein the at least one barrier layer individually has a thickness in the range of 1 µm-20 µm, and wherein the at least one polyolefin layer (C) is multilayer. In another embodiment of the present disclosure, the at least one polyolefin layer (C) is a two-layered structure. In yet another embodiment of the present disclosure, the at least one polyolefin layer (C) is a three-layered structure. In a further embodiment of the present disclosure, when the at least one polyolefin layer (C) is a two-layered structure or three-layered structure, the two layers or three layers may be joined by a tie polyethylene layer.

In an embodiment of the present disclosure, there is provided a multilayer barrier film (F) comprising: (a) at least one polyolefin core layer (A); (b) at least one barrier layer (B) on both the sides of the core layer; and (c) at least one polyolefin layer (C) adjacent to the at least one barrier layer, wherein the at least one barrier layer individually has a thickness in the range of 1 µm-25 µm, and wherein the at least one barrier layer comprises a member selected from the group consisting of ethylene vinyl alcohol, polyamide, polyethylene terephthalate or combinations thereof. Ethylene vinyl alcohol copolymer has an ethylene percentage ranging from 24-48 mol %

In an embodiment of the present disclosure, there is provided a multilayer barrier film (F) comprising: (a) at least one polyolefin core layer (A); (b) at least one barrier layer (B) on both the sides of the core layer; and (c) at least one polyolefin layer (C) adjacent to the at least one barrier layer, wherein the at least one barrier layer individually has a thickness in the range of 1 µm-25 µm, and wherein the at least one barrier layer comprises a member selected from the group consisting of ethylene vinyl alcohol, polyvinyl alcohol, polyamide, polyethylene terephthalate or combinations thereof. In case the barrier layer is ethylene vinyl alcohol, the ethylene vinyl alcohol copolymer has an ethylene percentage ranging from 24-48 mol %.

In an embodiment of the present disclosure, there is provided a multilayer barrier film (F) comprising: (a) at least one polyolefin core layer (A); (b) at least one barrier layer (B) on both the sides of the core layer; and (c) at least one polyolefin layer (C) adjacent to the at least one barrier layer, wherein the at least one barrier layer individually has a thickness in the range of 1 µm-20 µm, and wherein the at least one barrier layer comprises a member selected from the group consisting of ethylene vinyl alcohol, polyamide, polyethylene terephthalate or combinations thereof. Ethylene vinyl alcohol copolymer has an ethylene percentage ranging from 24-48 mol %.

In an embodiment of the present disclosure, there is provided a multilayer barrier film (F) comprising: (a) at least one polyolefin core layer (A); (b) at least one barrier layer (B) on both the sides of the core layer; and (c) at least one polyolefin layer (C) adjacent to the at least one barrier layer, wherein the at least one barrier layer individually has a thickness in the range of 1 µm-20 µm, and wherein the at least one barrier layer comprises a member selected from the group consisting of ethylene vinyl alcohol, polyvinyl alcohol, polyamide, polyethylene terephthalate or combinations thereof.

In an embodiment of the present disclosure, there is provided a multilayer barrier film as described herein, wherein the film has a thickness in the range of 20 µm-400 µm.

In an embodiment of the present disclosure, there is provided a multilayer barrier film as described herein, wherein the film has an OTR of equal to or less than 0.2 $cm^3/m^2/1$ day/1 atm, at a temperature in the range of 22° C.-25° C. at relative humidity in the range of 0-90% RH. In another embodiment of the present disclosure, there is provided a multilayer barrier film as described herein, wherein the film has an OTR in the range of 0.005-0.2 $cm^3/m^2/1$ day/1 atm, at a temperature in the range of 22° C.-25° C. at relative humidity in the range of 0-90% RH. In yet another embodiment of the present disclosure, there is provided a multilayer barrier film as described herein, wherein the film has an OTR in the range of 0.005-0.05 $cm^3/m^2/1$ day/1 atm, at a temperature in the range of 22° C.-25° C. at relative humidity in the range of 0-90% RH. In a further embodiment of the present disclosure, there is provided a multilayer barrier film as described herein, wherein the film has an OTR in the range of 0.005-0.02 $cm^3/m^2/1$ day/1 atm, at a temperature in the range of 22° C.-25° C. at relative humidity in the range of 0-90% RH. In an alternate embodiment of the present disclosure, there is provided a multilayer barrier film as described herein, wherein the film has an OTR of (less than 0.05)<0.05 $cm^3/m^2/1$ day/1 atm, at a temperature in the range of 22° C.-25° C. at relative humidity in the range of 0-90% RH.

In an embodiment of the present disclosure, there is provided a process of preparing the multilayer barrier film as described herein, wherein the film is prepared by a process selected from blown film process, cast film process, or lamination process of blown or cast films.

In an embodiment of the present disclosure, there is provided a process of preparing the multilayer barrier film as described herein, wherein the film is prepared by a blown film process in which the individual layers can be coextruded.

In an embodiment of the present disclosure, there is provided a process of preparing the multilayer barrier film as described herein, wherein the film is prepared by a cast film process.

In an embodiment of the present disclosure, there is provided a process of preparing the multilayer barrier film as described herein, wherein the film is prepared by lamination process of blown films.

In an embodiment of the present disclosure, there is provided a process of preparing the multilayer barrier film as described herein, wherein the film is prepared by lamination process of cast films.

In an embodiment of the present disclosure, there is provided a laminate comprising: (a) at least one print layer (X); (b) the multilayer barrier film (F) as described herein; and (c) at least one sealant layer (Y).

In an embodiment of the present disclosure, there is provided a laminate comprising: (a) at least one print layer (X); (b) the multilayer barrier film as described herein; and (c) at least one sealant layer (Y), wherein the at least one print layer comprises a polymer selected from high density polyethylene, medium density polyethylene, low density polyethylene, linear low-density polyethylene, and combinations thereof.

In embodiment of the present disclosure, there is provided a laminate comprising: (a) at least one print layer (X); (b) the multilayer barrier film as described herein; and (c) at least one sealant layer (Y), wherein the at least one print layer is a single layer or multilayer structure. In another embodiment of the present disclosure, the at least one print layer (X) is a two-layered structure. In yet another embodiment of the present disclosure, the at least one print layer (X) is a three-layered structure. In a further embodiment of the present disclosure, when the at least one print layer (X) is a two-layered structure or three-layered structure, the two layers or three layers may be joined by a tie polyethylene layer.

In an embodiment of the present disclosure, there is provided a laminate comprising: (a) at least one print layer (X); (b) the multilayer barrier film as described herein; and (c) at least one sealant layer (Y), wherein the at least one sealant layer (Y) comprises a polymer selected from high density polyethylene, medium density polyethylene, low density polyethylene, linear low-density polyethylene, linear low density polyethylene, and combinations thereof.

In an embodiment of the present disclosure, there is provided a laminate comprising: (a) at least one print layer (X); (b) the multilayer barrier film as described herein; and (c) at least one sealant layer (Y), wherein the at least one sealant layer (Y) is a single layer or multilayer structure. In another embodiment of the present disclosure, the at least one sealant layer (Y) is a two-layered structure. In yet another embodiment of the present disclosure, the at least one sealant layer (Y) is a three-layered structure. In a further embodiment of the present disclosure, when the at least one sealant layer (Y) is a two-layered structure or three-layered structure, the two layers or three layers may be joined by a tie polyethylene layer.

In an embodiment of the present disclosure, there is provided a laminate comprising: (a) at least one print layer (X); (b) the multilayer barrier film as described herein; and (c) at least one sealant layer (Y), wherein the at least one print layer has a thickness in the range of 50 µm-200 µm.

In an embodiment of the present disclosure, there is provided a laminate comprising: (a) at least one print layer (X); (b) the multilayer barrier film as described herein; and (c) at least one sealant layer (Y), wherein the at least one sealant layer has a thickness in the range of 50 µm-200 µm.

In an embodiment of the present disclosure, there is provided a laminate comprising: (a) at least one print layer (X); (b) the multilayer barrier film (F) as described herein; and (c) at least one sealant layer (Y), wherein the laminate reduces the OTR by at least 2 times in comparison to single barrier layer of about similar thickness.

In an embodiment of the present disclosure, there is provided a laminate comprising: (a) at least one print layer (X); (b) the multilayer barrier film (F) as described herein; and (c) at least one sealant layer (Y), wherein the laminate reduces the OTR by at least 5 times in comparison to single barrier layer of about similar thickness.

In an embodiment of the present disclosure, there is provided a laminate comprising: (a) at least one print layer (X); (b) the multilayer barrier film (F) as described herein; and (c) at least one sealant layer (Y), wherein the laminate reduces the OTR by at least 7 times in comparison to single barrier layer of about similar thickness.

In an embodiment of the present disclosure, there is provided a laminate comprising: (a) at least one print layer (X); (b) the multilayer barrier film (F) as described herein; and (c) at least one sealant layer (Y), wherein the laminate reduces the OTR by at least 10 times in comparison to single barrier layer of about similar thickness.

In an embodiment of the present disclosure, there is provided a laminate comprising: (a) at least one print layer (X); (b) the multilayer barrier film (F) as described herein; and (c) at least one sealant layer (Y), wherein the laminate reduces the OTR by at least 5-10 times in comparison to single barrier layer of about similar thickness.

In an embodiment of the present disclosure, there is provided a laminate as described herein, wherein the laminate has an OTR of equal to or less than $0.2\ cm^3/m^2/1\ day/1\ atm$, at a temperature in the range of 22° C.-25° C. at relative humidity in the range of 0-90% RH. In another embodiment of the present disclosure, there is provided a laminate as described herein, wherein the laminate has an OTR in the range of $0.005$-$0.2\ cm^3/m^2/1\ day/1\ atm$, at a temperature in the range of 22° C.-25° C. at relative humidity in the range of 0-90% RH. In yet another embodiment of the present disclosure, there is provided a laminate as described herein, wherein the laminate has an OTR in the range of $0.005$-$0.05\ cm^3/m^2/1\ day/1\ atm$, at a temperature in the range of 22° C.-25° C. at relative humidity in the range of 0-90% RH. In a further embodiment of the present disclosure, there is provided a laminate as described herein, wherein the laminate has an OTR in the range of $0.005$-$0.02\ cm^3/m^2/1\ day/1\ atm$, at a temperature in the range of 22° C.-25° C. at relative humidity in the range of 0-90% RH. In an alternate embodiment of the present disclosure, there is provided a laminate as described herein, wherein the laminate has an OTR of (less than 0.05)<$0.05\ cm^3/m^2/1\ day/1\ atm$, at a temperature in the range of 22° C.-25° C. at relative humidity in the range of 0-90% RH.

In an embodiment of the present disclosure, there is provided a process of preparing the laminate as described herein, the process comprising laminating the layer by extrusion lamination or adhesion lamination.

In an embodiment of the present disclosure, there is provided a process of preparing the laminate as described herein, the process comprising laminating the layer by adhesive lamination.

In an embodiment of the present disclosure, there is provided a process of preparing the laminate as described herein, the process comprising laminating the layer by extrusion lamination.

Figure 1:
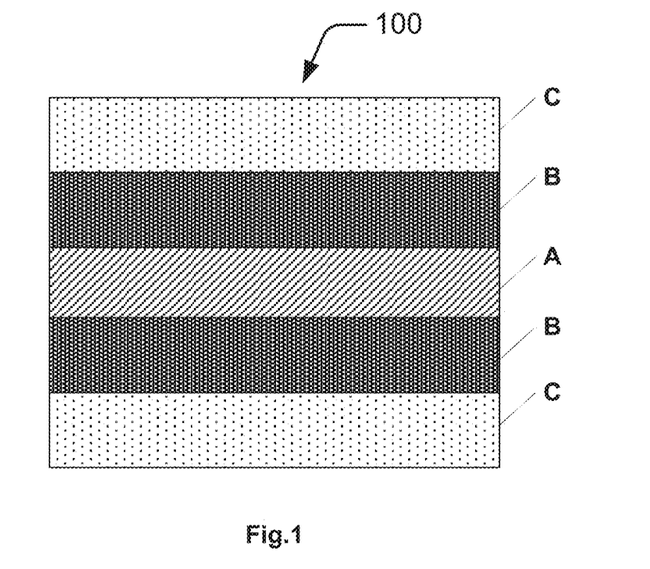
FIG. 1 illustrates a cross-section of a multilayer barrier film (F; 100), according to an implementation of the present disclosure.

In an example, the multilayer film is as represented in FIG. 1. The cross-section of the multilayer film 100 from comprises a polyolefin core layer (A); a barrier layer (B) on both the sides of the core layer (A) and a polyolefin layer (C) adjacent to both the barrier layer. The barrier layer (B) individually may have a thickness of 6 µm each. In an example, the barrier layer may be of a thickness of 6 µm and 3 µm individually. In another example, the barrier layer may be of a thickness of 3 µm and 10 µm individually. The barrier layer may be selected from EVAL™, SoarnoL™, or Evasin®. The polyolefin core layer (A) comprises a polymer having density in the range of 0.833 gm/cm³-0.99 g/cm³. The polyolefin core layer may comprise polymer selected from high density polyethylene, medium density polyethylene, low density polyethylene, linear low-density polyethylene, or combinations thereof. The polyolefin core layer may have a thickness in the range of 1 µm-100 µm. In an example the polyolefin core layer may be of thickness 90 µm. In another example the polyolefin core layer may be of thickness 80 µm. In yet another example, the polyolefin core layer may have a thickness of 60 µm. In a further example, the polyolefin core layer may have a thickness of 62 µm.

As shown in FIG. 1 the polyolefin layer (C) is present adjacent to the barrier layer (B). The polyolefin layer may be single layer or a multilayer structure. In an example, the polyolefin layer may be a two layer structure. In another example, the polyolefin layer may be a three layer structure. The polyolefin layer comprises a polymer having a density in the range of 0.920 gm/cm³-0.990 g/cm³. The polymer in the polyolefin layer may be selected from high density polyethylene, medium density polyethylene, low density polyethylene, linear low-density polyethylene, or combinations thereof. The polyolefin layer may have a thickness in the range of 3 µm-100 µm. In an example the polyolefin layer may be of thickness 30 µm. In another example the polyolefin layer may be of thickness 32 µm. In yet another example, the polyolefin layer may have a thickness of 15 µm. In a further example, the polyolefin layer may have a thickness of 85 µm.

Figure 2:
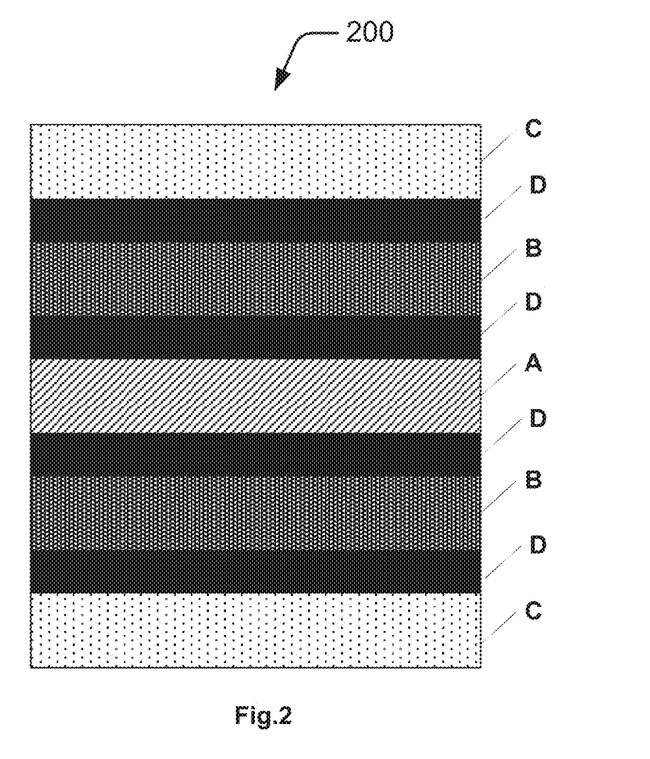
FIG. 2 illustrates a cross-section of multilayer barrier film (F; 200) comprising tie layers, according to an implementation of the present disclosure.

FIG. 2 differs from FIG. 1 only in that the multilayer barrier film 200 further comprises at least the tie layer (D). In an example, the multilayer barrier film comprising at least one tie layer (200) is represented in FIG. 2. The multilayer barrier film as shown in FIG. 2 further comprises at least one tie layer (D) to form the multilayer barrier film. In an example, one or more tie layer(s) may be disposed between the at least one polyolefin core layer and at least one barrier layer. In another example, the tie layer may be present between the at least one barrier layer and the at least one polyolefin layer. In yet another example, the tie layer is chosen to maximize compatibility within the layer(s) and to maximize adhesion between the layer(s). In a further example, if the barrier layer is EVOH layer a tie layer comprising a maleated polyethylene or maleic anhydride grafted polymer may be present between the at least one barrier layer and the at least one polyolefin layer. In an alternate example, if the barrier layer is EVOH layer a tie layer comprising a maleated polyethylene or maleic anhydride grafted polymer may be present between the at least one barrier layer and the at least one polyolefin core layer. The tie layer may have a thickness in the range of 2 µm-40 µm. In an example, the tie layer may have a thickness of 5 µm. In another example the tie layer may have a thickness of 8 µm.

Figure 3:
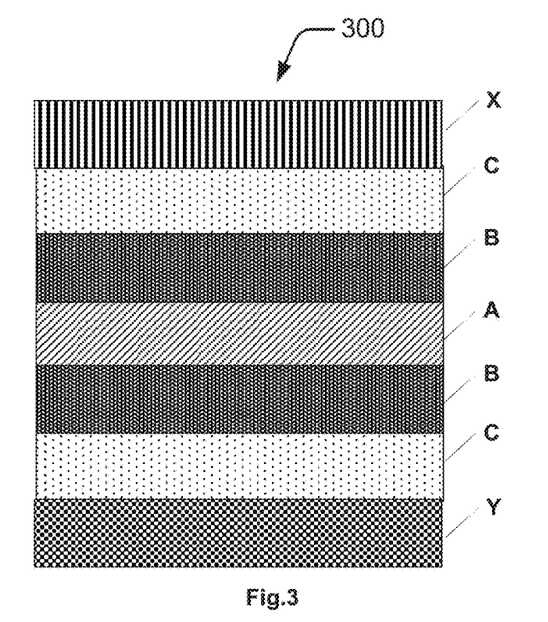
FIG. 3 illustrates a cross-section of a laminate (300) comprising multilayer barrier film (100), according to an implementation of the present disclosure.

FIG. 3 illustrates the laminate (300) of the present disclosure, wherein the multilayer barrier film of the FIG. 1 is used to prepare the laminate. As can be seen from FIG. 3 the laminate comprises at least one print layer (X), and at least one sealant layer (Y). In an example, the at least one print layer may be a single layer or multiple layer. In an example the print layer is a two-layer structure or a three-layer structure. The print layer comprises polymer selected from high density polyethylene, medium density polyethylene, low density polyethylene, linear low-density polyethylene, and combinations thereof. In an example, the print layer may have a thickness in the range of 50 µm-200 µm. In another example, the print layer has a thickness of 80 µm.

In an example the at least one sealant layer (Y) may be absent. In another example, the at least one sealant layer may be present and may be a single layer or multiple layer. In an example the sealant layer is a two-layer structure or a three-layer structure. The sealant layer comprises polymer selected from high density polyethylene, medium density polyethylene, low density polyethylene, linear low-density polyethylene, and combinations thereof. In an example, the sealant layer may have a thickness in the range of 50 µm-200 µm. In another example, the sealant layer has a thickness of 50 µm.

In an example, the laminate may comprise at least one print layer and at least one barrier film. In such a laminate the sealant layer is absent. In another example, the laminate may comprise at least one print layer (X)/at least one barrier film (F)/at least one sealant layer (Y).

Figure 4:
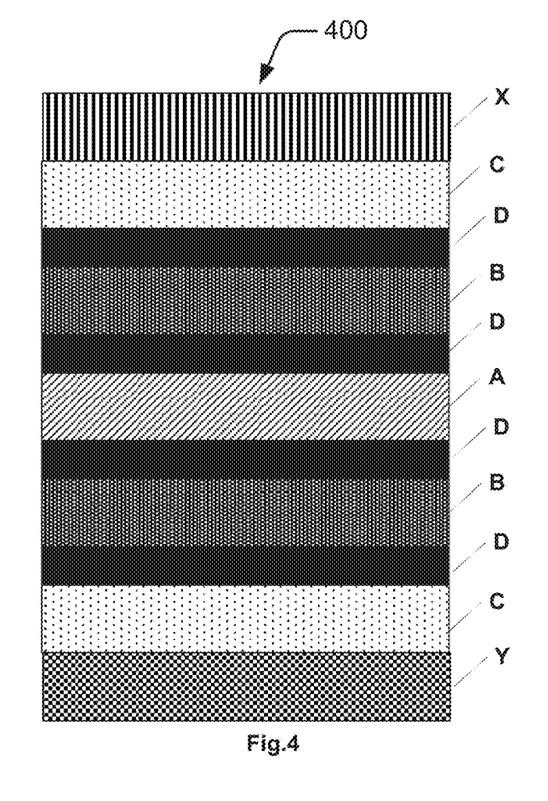
FIG. 4 illustrates a cross-section of laminate (400) comprising multilayer barrier film (200) having the tie layers, according to an implementation of the present disclosure.

FIG. 4 depicts the laminate (400) of the present disclosure, wherein the laminate of FIG. 3 further comprises at least one tie layer (D) to form the laminate 400. In an example, one or more tie layer(s) may be disposed between the at least one polyolefin core layer and at least one barrier layer. In another example, the tie layer may be present between the at least one barrier layer and the at least one polyolefin layer. In yet another example, the tie layer is chosen to maximize compatibility within the layer(s) and to maximize adhesion between the layer(s). In a further example, if the barrier layer is EVOH layer a tie layer comprising a maleated polyethylene or maleic anhydride grafted polymer may be present between the at least one barrier layer and the at least one polyolefin layer. In an alternate example, if the barrier layer is EVOH layer a tie layer comprising a maleated polyethylene or maleic anhydride grafted polymer may be present between the at least one barrier layer and the at least one polyolefin core layer. The tie layer may have a thickness in the range of 2 µm-40 µm. In an example, the tie layer may have a thickness of 5 µm. In another example the tie layer may have a thickness of 8 µm.

As can be seen from FIG. 4 the laminate comprises at least one print layer (X), and at least one sealant layer (Y). In an example, the at least one print layer may be a single layer or multiple layer. The print layer comprises polymer selected from high density polyethylene, medium density polyethylene, low density polyethylene, linear low-density polyethylene, and combinations thereof. In an example, the print layer may have a thickness in the range of 50 µm-200 µm. In another example, the print layer has a thickness of 80 µm.

In an example, the at least one sealant layer may be a single layer or multiple layer. The sealant layer comprises a polymer selected from high density polyethylene, medium density polyethylene, low density polyethylene, linear low-density polyethylene, and combinations thereof. In an example, the sealant layer may have a thickness in the range of 50 μm-200 μm. In another example, the sealant layer has a thickness of 50 μm.

In an embodiment of the present disclosure, there is provided an article comprising the multilayer barrier film of the present disclosure.

In an embodiment of the present disclosure, there is provided an article comprising the laminate of the present disclosure.

In an embodiment of the present disclosure, there is provided a use of the multilayer barrier film of the present disclosure for a packaging material. The multilayer barrier film may be used in making the inner barrier liners (IBL), shoulder barrier liners (SBL), lami-tube, or a packaging material. The barrier film of the present disclosure may be used as an inner barrier liner (IBL) in a packaging material or the shoulder barrier liner (SBL) of packaging material or the sleeve of a packaging material or Top seal of a packaging material. The IBL/SBL/Top seal works as an effective moisture and oxygen barrier for packaging products which are environmentally sensitive. The packaging material may be a lami-tube.

In an embodiment of the present disclosure, there is provided a use of the laminate of the present disclosure for a packaging material. In another embodiment of the present disclosure, the packaging material may be lami-tube.

Although the subject matter has been described in considerable detail with reference to certain examples and implementations thereof, other implementations are possible.

EXAMPLES

The disclosure will now be illustrated with working examples, which is intended to illustrate the working of disclosure and not intended to take restrictively to imply any limitations on the scope of the present disclosure. Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices and materials are described herein. It is to be understood that this disclosure is not limited to particular methods, and experimental conditions described, as such methods and conditions may apply.

Abbreviations:

MA-grafted tie layer: maleic anhydride grafted tie layer

EVOH: ethylene vinyl alcohol, wherein the ethylene content is 24-48 mol %.

Example 1

Process for Preparing a Multilayer Barrier Film and a Laminate of the Present Disclosure.

The multilayer barrier film of the present disclosure is prepared by blown film extrusion, wherein all the layers are prepared by blown film extrusion and then are extrusion laminated to form the multilayer barrier film. The process of film extrusion is a well-known process as discussed in the references [H. F. Guiles Jr., J. R. Wagner Jr., E. M. Mount III, Extrusion The definitive processing guide and handbook, William Andrew Inc, Norwich, N.Y., (2005), 453-463; and T. I. Butler, G. E. Ealer, S. B. Marks, G. D. Oliver, J. Perdikoulias. (eds) Film extrusion manual, 2nd edn. TAPPI (2005)].

The multilayer barrier film of the present disclosure can also be made by a cast film process well known in the art. More detailed information regarding the cast film process can be extracted from the following references: H. F. Guiles Jr., J. R. Wagner Jr., E. M. Mount,. III, Extrusion The definitive processing guide and handbook, William Andrew Inc, Norwich, N.Y., (2005), 301-306; T. I. Butler, G. E. Ealer, S. B. Marks, G. D. Oliver, J. Perdikoulias. (eds) Film extrusion manual, 2nd edn. TAPPI (2005); J. Vlachopoulos, J. R. Wagner,. Jr., The SPE guide on extrusion technology and troubleshooting, Society of Plastics Engineers, Brookfield, Conn., (2001); and A. R. Calhoun, J. R. Wagner,. Jr., Extrusion processes, Plastics technician's toolbox, book 6, Society of Plastics Engineers, Brookfield, Conn., (2004).

For the preparation of Film 1, firstly, a 5-layered barrier film (25 μm (polyolefin layer; 80% HDPE+20% LDPE)/5 μm maleated-PE (tie layer)/ 6 μm EVOH (barrier layer)/5 μm maleated-PE (tie layer)/30 μm PE (polyolefin core layer) was produced by using a co-extruded blown film and was taken from the first unwinding station to the extrusion station. Secondly, an another Film 1 of 5-layer film (30 μm (polyolefin core layer; 58% HDPE+42% LDPE)/5 μm maleated-PE (tie layer)/6 μm EVOH (barrier layer)/5 μm maleated-PE (tie layer)/25 μm (polyolefin layer; 80% HDPE+20% LDPE)) was produced by using a co-extruded blown film and was taken from the second unwinding station to the extrusion lamination station to bond together utilizing a 20 μm PE (LDPE/LLDPE melt) to make a multilayer barrier film having staggered barrier layer of 6 μm and 6 μm separated by a 80 μm polyolefin core layer. The manufacturing process in this invention uses general available machines such as a co-extruded blown film manufacturing line, a co-extrusion lamination line.

Using the process as described above, Film 2, Film 3, Film 4, Film 5 were prepared, wherein the structure/layering of the films are as described in the Table 3.

Various kinds of multilayer barrier films are possible and may be prepared as per the process described above. In an example the multilayer barrier film of present disclosure may have structure as explained below. The structures may be created with various polyolefin layer blends. The polyolefin layer may be a single layer in some examples and may be a multilayer structure in another example. In case of a multilayer structure the polyolefin layer may comprise barrier layer also. The barrier layer may be selected from EVOH or polyamide as per requirement. The PE of the polyolefin layer may be a blend of polyethylenes selected from high density polyethylene, medium density polyethylene, low density polyethylene, linear low-density polyethylene, and combinations thereof.

TABLE 1

Multilayer barrier film

| S.No. | Polyolefin layer | Barrier layer | Polyolefin core layer | Barrier layer | Polyolefin layer |
|---|---|---|---|---|---|
| 1. | PE | EVOH | PE | EVOH | PE |
| 2. | PE | EVOH | PE | EVOH | PE//EVOH//PE |
| 3. | PE | polyamide | PE | polyamide | PE |
| 4. | PE | polyamide | PE | EVOH | PE |
| 5. | PE | EVOH | PE | polyamide | PE |
| 6. | PE | polyamide | PE | Polyamide | PE//polyamide//PE |
| 7. | PE | polyamide | PE | EVOH | PE//polyamide//PE |
| 8. | PE//EVOH//PE | polyamide | PE | polyamide | PE |
| 9. | PE | polyamide | PE | Polyamide | PE//EVOH//PE |
| 10. | PE/PE | EVOH | PE | EVOH | PE//EVOH//PE/PE |
| 11. | PE/PE | EVOH | PE | EVOH | PE/PE |
| 12. | PE/PE | polyamide | PE | polyamide | PE/PE |
| 13. | PE/PE | polyamide | PE | EVOH | PE/PE |
| 14. | PE/PE | EVOH | PE | polyamide | PE/PE |
| 15. | PE/PE | polyamide | PE | Polyamide | PE//polyamide//PE/PE |
| 16. | PE/PE | polyamide | PE | EVOH | PE//polyamide//PE/PE |
| 17. | PE/PE | EVOH | PE | polyamide | PE//polyamide//PE/PE |
| 18. | PE/PE | polyamide | PE | Polyamide | PE//EVOH//PE/PE |
| 19. | PE/PE/PE | EVOH | PE | EVOH | PE//EVOH//PE/PE/PE |
| 20. | PE/PE/PE | EVOH | PE | EVOH | PE/PE/PE |
| 21. | PE/PE/PE | polyamide | PE | polyamide | PE/PE/PE |
| 22. | PE/PE/PE | polyamide | PE | EVOH | PE/PE/PE |
| 23. | PE/PE/PE | EVOH | PE | polyamide | PE/PE/PE |
| 24. | PE/PE/PE | polyamide | PE | Polyamide | PE//polyamide//PE/PE/PE |
| 25. | PE/PE/PE | polyamide | PE | EVOH | PE//polyamide//PE/PE/PE |
| 26. | PE/PE/PE | EVOH | PE | polyamide | PE//polyamide//PE/PE/PE |
| 27. | PE/PE/PE | polyamide | PE | Polyamide | PE//EVOH//PE/PE/PE |
| 28. | PE | EVOH | PE | Polyamide | PE//EVOH//PE |

In all the examples provided above the at least one barrier layer may be replaced by a polyester layer. Moreover, the polyolefin layer, barrier layer, and polyolefin core layer are connected via at least one tie layer D. The tie layer is provided between the various layers to ensure that the layers are sufficiently tightly connected to each other and that the connected layers can be jointly drawn and the mutual adhesion may be preserved. The adhesive layer is a layer based on modified polyolefins. The tie layer is a 5 μm maleated-PE.

Process of Preparing a Laminate:

The multilayer barrier film made by blown film process or the cast film process as described above may be used to prepare a laminate, wherein the laminate includes at least one print layer (X), and optionally at least one sealant layer (Y). The process of preparing a laminate may be selected from either an adhesive lamination process or extrusion lamination process.

More details regarding the lamination process are present in Wolf R. "A technology decision-adhesive lamination or extrusion coating/lamination?" In: Tappi place Conference, April Albuquerque (N. Mex.); 2010. Viewed on 26 May 2020, from: https://imisrise.tappi.org/TAPPI/Products/10/PLA/10PLA57.aspx which is hereby incorporated by reference.

The process of preparation of the laminate of the present disclosure is the same as the process of preparation of film.

For the preparation of Laminate 1, firstly, a 5-layered barrier film ([25 μm (sealant layer; 80% LLDPE+20% LDPE)/5 μm maleated-PE (tie layer)/3 μmEVOH(barrier layer)/5 μm maleated-PE (at least one tie layer)/10 μm PE (polyolefin core layer)] was produced by using a co-extruded blown film and was taken from the first unwinding station to the extrusion station. Secondly, an another Laminate 1 of 5-layer barrier film [35 μm PE (polyolefin core layer)/10 μm maleated-PE (tie layer)/10 μmEVOH (barrier layer)/10 μm maleated-PE (tie layer)//35 μm (print layer: [15 μmPE (polyolefin layer) was produced by using a co-extruded blown film and was taken from the second unwinding station to the first extrusion lamination station to bond together utilizing a 20 μm PE (LDPE/LLDPE melt), this laminate was further laminated to 50 μm [80% LLDPE+20% LDPE] sealant utilizing 20 μm tie layer in second extrusion lamination to make final laminate of the present disclosure comprising the print layer (X) and the sealant layer (Y). The laminate can be made by utilizing single extrusion lamination or tandem extrusion lamination depending upon the final architecture.

For Laminate 2, the structure shown in the Table 4 was extrusion laminated using a similar process as per the structure of Laminate 1.

Example 2

Barrier Properties of the Multilayer Barrier Film of the Present Disclosure

A series of tests were conducted on the various films prepared by the process as explained in Example 1. The test condition used for conduction the OTR test are in Table 2 below:

TABLE 2

| Test Condition | For OTR testing |
|---|---|
| Standard Used | ASTM D 3985-05 |
| Room Temp. | 22 +/− 2° C. |
| Test Temp. | 23 +/− 0.5° C. |
| Test RH | 0% +/− 3% RH |
| Carrier RH | 0% +/− 3% RH |

TABLE 2-continued

| Test Condition | For OTR testing |
|---|---|
| Conditioning | 1 Hr |
| Test Area | 50 cm$^2$ |
| Machine Model | MOCON OTR 2/22-L |

The OTR results of various multilayer barrier films are recorded in Table 3. The purpose of these tests was to demonstrate that the OTR varies if a single barrier layer is used in the film in comparison to a film wherein the two barrier layers are used separated by a polyolefin core layer. The structure and design of the multilayer barrier film of the present disclosure provided enhanced barrier properties and the same was confirmed by the extremely low oxygen transmission rate (OTR) values.

Table 3 illustrates that when a single barrier layer was used in the multilayer barrier film an OTR value of 0.32 was attained (CF1). In contrast, if the single barrier layer was replaced by two barrier layers separated by a polyolefin core layer, such a multilayer barrier film (Film 1, Film 2, and Film 3) showed extremely low oxygen transmission rate (OTR) values, i.e., <0.05. It can thus be inferred that the presence of the polyolefin core layer (Film 1, Film 2, Film 3) and having two barrier (EVOH) layers of similar thickness, resulted in the enhancement of barrier properties, i.e., unexpected low OTR values.

Similar inference can be drawn from the Film 4 and the comparative films CF2, CF3, and CF4. CF2, CF3, and CF4 individually had barrier layers of 15 μm, but when the single layer was replaced by two barrier layers separated by a polyolefin core layer, i.e., Film 4 a drastic reduction in the oxygen transmission rate was observed, thereby improving the barrier properties.

Analogous results were observed with Film 5 and Comparative Film 5. Comparative Film 5 showed an oxygen transmission rate value of 19, but when two barrier layers of 48 μm each were separated by polyolefin core layer substantial reduction in the oxygen transmission rate was observed, i.e, an OTR value of 2 was achieved at 0% RH.

From the above explanation splitting the barrier layer into two layers creates structural and physical improvements in terms of barrier properties in the film and the laminate. For example, if a comparison is drawn between an individual EVOH layer and a EVOH layer that is split into two layers side by side separated by a polyethylene layer, the film/laminate produced have improved barrier properties.

TABLE 3

Multilayer barrier films with OTR values

| S.No. | Films | Barrier layer Variant | Structure | barrier layer thickness | OTR cc/m$^2$ · day; @ 0% RH |
|---|---|---|---|---|---|
| 1. | Film 1 | EVAL ™ | 25 μm (polyolefin layer; 80% HDPE + 20% LDPE)/5 μm maleated-PE (tie layer)/6 μm EVOH (barrier layer)/5 μm maleated-PE (tie layer)/80 μm PE (polyolefin core layer)/5 μm maleated-PE (tie layer)/6 μm EVOH (barrier layer)/5 μm maleated-PE (tie layer)/25 μm (polyolefin layer; 80% HDPE + 20% LDPE) | 6 μm + 6 μm | <0.05 |
| 2. | Film 2 | EVAL ™ | 25 μm (polyolefin layer; 80% HDPE + 20% LDPE)/5 μm maleated-PE (tie layer)/6 μm EVOH (barrier layer)/5 μm maleated-PE (tie layer)/60 μm PE (polyolefin core layer)/5 μm maleated-PE (tie layer)/6 μm EVOH (barrier layer)/5 μm maleated-PE (tie layer)/25 μm (polyolefin layer; 80% HDPE + 20% LDPE) | 6 μm + 6 μm | <0.05 |
| 3. | CF1 | EVAL ™ | 90 μmPE//12 μm EVOH//50 μmPE | 12 μm | 0.32 |
| 4. | Film 3 | EVAL ™ | 25 μm (polyolefin layer; 80% HDPE + 20% LDPE)/5 μm maleated-PE (tie layer)/6 μm EVOH (barrier layer)/5 μm maleated-PE (tie layer)/55 μm PE (polyolefin core layer)/5 μm maleated-PE (tie layer)/3 μmEVOH (barrier layer)/5 μm maleated-PE (tie layer)/10 μm PE (polyolefin layer) | 6 μm + 3 μm | <0.05 |
| 5. | Film 4 | EVAL ™; Nylon-6 | 25 μm (80% HDPE + 20% LDPE)/5 μm maleated-PE/5 μmEVOH/5 μm polyamide/5 μmEVOH/5 μm maleated-PE/50 μm (polyolefin core layer; | 15 μm + 15 μm | 0.02 |

TABLE 3-continued

Multilayer barrier films with OTR values

| S.No. | Films | Barrier layer Variant | Structure | barrier layer thickness | OTR cc/m$^2$ · day; @ 0% RH |
|---|---|---|---|---|---|
| 8. | CF2 | EVAL ™; Nylon-6 | 80% HDPE + 20% LDPE)/5 μm maleated-PE/5 μmEVOH/5 μm polyamide/5 μmEVOH/5 μm maleated-PE/25 μm(80% HDPE + 20% LDPE) 25 μm | 15 μm | 0.22 |
| 7. | CF3 | EVAL ™ | (80% HDPE + 20% LDPE)/5 μm maleated-PE/5 μmEVOH/ 5 μm polyamide/ 5 μmEVOH/5 μm maleated-PE/25 μm(80% HDPE + 20% LDPE) 25 μm | 15 μm | 0.22 |
| 6. | CF4 | EVAL ™ | (80% HDPE + 20% LDPE)/5 μm maleated-PE//15 μmEVOH//5 μm maleated-PE/ 25 μm(80% HDPE + 20% LDPE) 20 μm | 11 μm | 0.32 |
| 5. | Film 5 | Nylon-6 | (80% HDPE + 20% LDPE)/5 μm maleated-PE//11 μmEVOH//5 μm maleated-PE/10 μm (80% HDPE + 20% LDPE) 80 μm PE (polyolefin layer; HDPE)/16 μm modified PE (tie layer; maleated LLDPE)/24 μm polyamide (barrier layer)/16 μm modified PE(tie layer; maleated LLDPE)/24 μm polyamide (barrier layer)//80 μm PE (polyolefin core layer; HDPE)/16 μm modified PE (tie layer; maleated LLDPE)/24 μm polyamide (barrier layer)/16 μm modified PE(tie layer; maleated LLDPE)/24 μm polyamide (barrier layer) | (24 μm + 24 μm) + (24 μm + 24 μm) | 2 |
| 9. | CF5 | Nylon-6 | 24 μm polyamide/16 μm modified PE/24 μm polyamide/16 μm modified PE (maleated LLDPE)/80 μm PE | 24 μm + 24 μm | 19 |

Example 3

Barrier Properties of the Laminate of the Present Disclosure

Barrier effectiveness of the laminate of the present disclosure was also specifically OTR at 0% RH, in a similar manner as described for the multilayer barrier film explained in Example 2. The test conditions were similar to the ones provided in Table 2.

TABLE 4

Laminate of the present disclosure comprising print layer and optionally a sealant layer

| S.No. | Laminate | Barrier | Structure | Barrier layer thickness | OTR cc/m$^2$ · day; @ 0% RH |
|---|---|---|---|---|---|
| 1. | Laminate 1 | EVAL ™ | [25 μm (sealant layer; 80% LLDPE + 20% LDPE)/5 μm maleated-PE (tie layer)/3 μmEVOH(barrier layer)/5 μm maleated-PE (at least one tie layer)/10 μm PE (polyolefin core layer)]//20 μmPE (polyolefin core layer)//[35 μm PE (polyolefin core layer)/10 μm maleated-PE (tie | 3 μm + 10 μm | <0.05 |

TABLE 4-continued

Laminate of the present disclosure comprising print layer and optionally a sealant layer

| S.No. | Laminate | Barrier | Structure | Barrier layer thickness | OTR cc/m² · day; @ 0% RH |
|---|---|---|---|---|---|
| 2. | Laminate 2 | EVAL ™; Nylon-6 | layer)/10 µmEVOH (barrier layer)/10 µm maleated-PE (tie layer)//15 µmPE (polyolefin layer)]//20 µm PE (polyolefin layer or tie layer)//50 µm (; 80% LLDPE + 20% LDPE) 25 µm (print layer; 80% HDPE + 20% LDPE)/5 µm maleated-PE (tie layer)/5 µmEVOH (barrier layer)/5 µm polyamide (barrier layer)/5 µmEVOH (barrier layer)/5 µm maleated-PE (tie layer)/25 µm(polyolefin core layer; 80% HDPE + 20% LDPE)//25 µm (polyolefin core layer; 80% HDPE + 20% LDPE)/5 µm maleated-PE (tie layer)/5 µmEVOH (barrier layer)/5 µm polyamide (barrier layer)/5 µmEVOH (barrier layer)/5 µm maleated-PE (tie layer)/25 µm(polyolefin layer; 80% HDPE + 20% LDPE) | 15 µm + 15 µm | 0.02 |

From the above Table 4 it is discernible, that replacing a single barrier layer of certain thickness with two barrier layers separated by a polyolefin core layer results in a laminate with enhanced barrier properties, i. e, an OTR of 0.02-0.05 cc/m².day at 0% RH. Reduction of approximately at least 2-15 times was observed in the OTR. The polyolefin core layer may be a single layer or multiple layers having thickness in the range of 1 µm-100 µm. The constituents of the polyolefin core layer may be selected from the group consisting of high density polyethylene, low density polyethylene, linear low density polyethylene, polypropylene, polypropylene copolymers, and combinations thereof.

Advantages of the Present Disclosure:

The multilayer barrier film and the laminate of the present disclosure provides enhanced barrier properties. The structure of the film and the laminate is such that an OTR in the range of 0.005-0.2 cm³/m²/1 day/1 atm, at a temperature in the range of 22° C.-25° C., at relative humidity in the range of 0 to 90% RH is achieved.

The design of the multilayer barrier film enhances economic value compared to commercial films and help in achieving multilayer film design with lesser film thickness yet higher barrier properties.

Although the subject matter has been described in considerable detail with reference to certain examples and implementations thereof, other implementations are possible. As such, the spirit and scope of the appended claims should not be limited to the description of the preferred examples and implementations contained therein.

We claim:

1. A multilayer barrier film comprising:
   (a) at least one polyolefin core layer selected from the group consisting of high density polyethylene, medium density polyethylene, low density polyethylene, and linear low density polyethylene;
   (b) at least one barrier layer comprising ethylene vinyl alcohol on both the sides of the core layer; and
   (c) at least one polyolefin layer adjacent to the at least one barrier layer,
   wherein each of the at least one barrier layers has thickness in the range of 2 µm-15 µm,
   wherein the film has an oxygen transmission rate (OTR) equal to or less than 0.05 cm³/m²/1 day/1 atm, at a temperature in the range of 22° C.-25° C. at relative humidity in the range of 0-90% RH, and
   wherein the at least one polyolefin core layer does not include a layer of propylene copolymers, and
   wherein the film is prepared by a blown film process.

2. The multilayer barrier film as claimed in claim 1, wherein the at least one polyolefin core layer is multilayer.

3. The multilayer barrier film as claimed in claim 1, wherein the at least one polyolefin core layer comprises polymer having density in the range of 0.833 g/cm3-0.99 g/cm3.

4. The multilayer barrier film as claimed in claim 1, wherein the at least one polyolefin core layer has a thickness in the range of 1 µm-100 µm.

5. The multilayer barrier film as claimed in claim 1, wherein the at least one polyolefin layer comprises polymer having density in the range of 0.833 g/cm3-0.990 g/cm3.

6. The multilayer barrier film as claimed in claim 1, wherein the at least one polyolefin layer has a thickness in the range of 3 µm-100 µm.

7. The multilayer barrier film as claimed in claim 1, wherein the at least one polyolefin layer is multilayer.

8. The multilayer barrier film as claimed in claim 1, wherein the at least one barrier layer further comprises a member selected from the group consisting of polyamide-sand polyethylene terephthalate.

9. The multilayer barrier film as claimed in claim 1, wherein the film has a thickness in the range of 20 µm-400 µm.

10. The multilayer barrier film as claimed in claim 1, further comprises at least one tie layer.

11. The multilayer barrier film as claimed in claim 10, wherein the at least one tie layer comprises polymeric adhesive selected from the group consisting of maleated polyethylene, anhydride grafted ethylene/1-butene copolymer, anhydride grafted ethylene/1-hexene copolymer, polypropylene, propylene ethylene copolymer, ethylene vinyl acetate copolymer, ethylene methyl acrylate copolymer, and anhydride grafted ethylene/1-octene copolymer.

12. The multilayer barrier film as claimed in claim 10, wherein the at least one tie layer has a thickness in the range of 2 µm-40 µm.

13. A process of preparing the multilayer barrier film as claimed in claim 1, the method comprising preparing the film by a blown film process.

14. A laminate comprising:
at least one print layer; and
the multilayer barrier film as claimed in claim 1.

15. The laminate as claimed in claim 14, wherein the at least one print layer comprises a polymer selected from high density polyethylene, medium density polyethylene, low density polyethylene, linear low-density polyethylene, polypropylene (PP), polypropylene copolymers, ethylene copolymers, and combinations thereof.

16. The laminate as claimed in claim 14, wherein the at least one print layer has a thickness in the range of 50 µm-200 µm.

17. The laminate as claimed in claim 14, wherein the laminate reduces the oxygen transmission rate (OTR) by at least 2 times in comparison to single barrier layer of about same thickness.

18. The laminate as claimed in claim 14, wherein the laminate has an oxygen transmission rate (OTR) equal to or less than 0.2 cm3/m2/1 day/1 atm, at a temperature in the range of 22° C.-25° C. at relative humidity in the range of 0-90% RH.

19. The laminate as claimed in claim 14, further comprising a sealant layer on the at least one print layer.

20. The laminate as claimed in claim 19, wherein the at least one sealant layer comprises a polymer selected from high density polyethylene, medium density polyethylene, low density polyethylene, linear low-density polyethylene, and combinations thereof.

21. The laminate as claimed in claim 19, wherein the at least one sealant layer has a thickness in the range of 50 µm-200 µm.

22. A process of preparing the laminate as claimed in claim 14, the process comprising laminating the layer by adhesive lamination or extrusion lamination.

23. An article comprising the multilayer barrier film as claimed in claim 1.

24. A method of preparing a packaging material, comprising laminating a print layer onto the multilayer barrier film as claimed in claim 1 and forming the laminated film into a packaging material.

25. The method as claimed in claim 24, wherein the packaging material is a lamitube.

* * * * *